2,788,377
Patented Apr. 9, 1957

2,788,377
METHOD OF PRODUCING DICYCLOPENTA-DIENYLMAGNESIUM

William A. Barber, Stamford, Conn., assignor to American Cyanamid Company, New York, N. Y., a corporation of Maine No Drawing. Application December 27, 1955,
Serial No. 555,306

6 Claims. (Cl. 260—665)

This invention relates to the preparation of metalloorganic compounds and, more particularly, to the preparation of dicyclopentadienylmagnesium [$Mg(C_5H_5)_2$].

Dicyclopentadienylmagnesium is a known compound, and a method of preparing the same from a Grignard reagent (cyclopentadienylmagnesium bromide) is described in Chemistry and Industry, 1954, pages 307–308. As is well-known, Grignard reagents are suitable for laboratory preparations of metallo-organic compounds but are generally too expensive for use in commercial operations.

It is a primary object of the present invention to provide a less costly and more efficient method of producing dicyclopentadienylmagnesium than was previously known.

The instant invention is based on my discovery that dicyclopentadienylmagnesium can be produced by direct reaction between magnesium (metallic magnesium) and cyclopentadiene or substances engendering cyclopentadiene. The reaction is effected at a temperature of at least about 450° C., and may range, for instance, between about 450° C. and about 1000° C. depending upon the particular reactant which is reacted with magnesium to produce the dicyclopentadienylmagnesium. For example, the reaction between magnesium and gaseous cyclopentadiene is preferably effected at a temperature of between about 500° C. and about 600° C.; while the reaction between magnesium and a hydrocarbon engendering cyclopentadiene, which hydrocarbon is in gaseous state, is preferably effected at a temperature of between about 600° C. and about 1000° C. In general, the reaction is carried out at the lowest possible temperature which is consistent with optimum yields and minimum deposition of carbon in the reaction zone.

The reaction is preferably effected while at least the cyclopentadiene or substance which engenders cyclopentadiene (e. g., a hydrocarbon of the $C_2$ to $C_{10}$ series or higher) is in a gaseous state. However, liquid-phase reactions are not precluded, in which case superatmospheric pressure is used to keep the organic reactant in the liquid state at the desired temperature. Also, metallic or other catalysts may be employed to accelerate the reaction. If desired, the reaction may be effected in the presence of an inert gas (that is, one which is inert both to the reactants and to the reaction product, e. g., helium, argon and krypton) thereby to provide, for example, better control of the reaction. Such a gas also may serve as a carrier for, or diluent of, the organic reactant. It also aids in removing the dicyclopentadienylmagnesium from the reaction zone.

Instead of magnesium one can use an alloy of magnesium, e. g., a magnesium-aluminum alloy. Alloys of magnesium with a metallic catalyst for the reaction can be used. Instead of cyclopentadiene alone or a substance engendering cyclopentadiene alone, one can use mixtures thereof in any proportions. Cyclopentadiene is preferred because of the higher yields obtained by its use.

It was quite surprising and unexpected that dicyclopentadienylmagnesium could be produced by the method of this invention, especially since efforts to produce the corresponding compounds from other metals, specifically barium, aluminum, tin, zinc, uranium, cobalt, nickel and titanium by direct reaction with cyclopentadiene at elevated temperatures were unsuccessful. In all cases yellow, tarry products, presumably from cracking of the cyclopentadiene, were obtained.

In order that those skilled in the art may better understand how the present invention can be carried into effect, the following examples are given by way of illustration and not by way of limitation. All parts and percentages are by weight.

Example 1

Approximately 50 parts of magnesium metal powder is weighed into an open porcelain vessel, which is then placed inside a Vycor tube mounted horizontally in an electrically-heated furnace. Suitable connections are provided at both ends of the tube for introducing cyclopentadiene vapor and the removal of the reaction product and exit gases without exposure to the atmosphere.

The cyclopentadiene monomer is generated at the time of use by cracking commercial dicyclopentadiene in a reaction vessel provided with a column filled with glass beads, the cracking being continued at such a rate that the temperature at the top of the column remains at 42° C. which is the boiling point of monomeric cyclopentadiene. From the top of the column the cyclopentadiene vapor is mixed with a stream of an inert gas, specifically helium, and the mixture is passed directly into the furnace. Suitable means are provided for controlling and measuring the temperature in the furnace.

At a temperature of 500° C. colorless crystals are formed on the wall of the tube outside the furnace, these crystals subsequently being identified as dicyclopentadienylmagnesium. At higher temperatures (e. g., at about 600° C. and higher), the formation of crystals of dicyclopentadienylmagnesium is more rapid but contamination of the product with organic material is more likely to take place at such higher temperatures.

During part (15 minutes) of the total reaction period, 65 parts of cyclopentadiene is passed over the magnesium metal powder, at a reaction temperature of 510°–540° C., to give approximately 23 parts of dicyclopentadienylmagnesium. Approximately 10 parts of unreacted cyclopentadiene is recovered. A yield of approximately 36% of dicyclopentadienylmagnesium is thereby obtained, based on the amount of cyclopentadiene used.

The reaction product is obtained as a white, crystalline powder or as large, well-formed, colorless crystals. It reacts rapidly with water to give cyclopentadiene (identified as such by infrared examination). It reacts rapidly with oxygen to yield an orange-brown polymeric product. The dicyclopentadienylmagnesium produced as described above melts at 176° C. It can be readily sublimed at much lower temperatures and kept indefinitely sealed in glass. A convenient way of handling the product is to sublime it into a solvent, e. g., purified ether, purified tetrahydrofuran, etc. Such methods can be used in removing the product from the cooler portions of the reaction apparatus in which some of it initially may have been deposited.

Example 2

Same as in Example 1 with the exception that the magnesium metal is in the form of magnesium turnings, which are placed in a vertical furnace above a perforated porcelain disc. The bed of turnings is heated by an electrical furnace to 540° C. The reaction temperature conveniently may be measured by means of a thermocouple placed in a thermocouple well located at the center of the column of magnesium turnings.

A stream of cyclopentadiene vapor, produced as is described in Example 1, is passed down through the heated column of magnesium turnings. This vapor combines with the hot magnesium to produce white, crystalline dicyclopentadienylmagnesium which drops from the bottom of the furnace. This product can be collected as a solid or in solution in either ether or tetrahydrofuran in the absence of oxygen and water.

*Example 3*

Approximately three parts of magnesium metal turnings or powder are weighed into a porcelain vessel and placed in a Vycor furnace tube as in Example 1. A stream of pure normal butane or natural butane (69 volume percent normal butane, 31 volume percent isobutane) is passed over the metal turnings at 680°–720° C. An inert gas (helium) mixed with the butane is used to control the residence time of the hydrocarbon in the furnace. After 2½ hours 58 parts of hydrocarbon gas passes through and a small yield of colorless, crystalline $Mg(C_5H_5)_2$ is deposited on the cooler portions of the furnace tube. The $Mg(C_5H_5)_2$ produced in this reaction is identical in properties and X-ray powder pattern with that produced in Example 1.

*Example 4*

Approximately five parts of magnesium metal powder are weighed into a porcelain vessel and placed in a Vycor furnace tube as in Example 1. Liquid pentane is dropped slowly into a vaporizing chamber held at 70° C. through which a slow stream of helium gas is passing. The pentane vapor is carried by the gas stream over the magnesium metal at 680°–720° C. A total of 72 parts of pentane (one mole) is added in 2½ hours to produce a small yield of $Mg(C_5H_5)_2$ identical by X-ray pattern with the material produced in the other examples.

*Example 5*

Approximately three parts of magnesium turnings are weighed into a porcelain vessel and placed in a Vycor furnace tube as in Example 1. Liquid, normal heptane is dropped slowly into a vaporizing chamber at about 150° C. as in Example 4. The vapor is carried over the magnesium metal at 680°–700° C. and crystals of $Mg(C_5H_5)_2$ are produced as in previous examples. In this case, due to the higher boiling point of heptane, all the lines leading from the vaporizer through the furnace are heated to minimize condensation of the heptane (B. P. 98° C.).

*Example 6*

Ethylene gas, from which a polymer is to be made by high-pressure polymerization technique, and which contains an objectionably high amount of oxygen when the gas is to be used for this purpose, is bubbled through a 5% solution of dicyclopentadienylmagnesium in purified tetrahydrofuran at 10° C., using a closed system. After passage through the aforesaid solution, the oxygen content of the ethylene is sufficiently reduced so that the ethylene can be successfully polymerized under high pressure.

In addition to its use as an oxygen scavenger, dicyclopentadienylmagnesium is useful as an intermediate in chemical reactions, e. g., as a reactant with carbon dioxide to yield salts of a dicyclopentadiene dicarboxylic acid.

I claim:

1. The method of preparing dicyclopentadienylmagnesium which comprises reacting, at a temperature of at least about 450° C., (1) a metal comprising magnesium with (2) at least one member of the class consisting of cyclopentadiene and substances engendering cyclopentadiene.

2. A method as in claim 1 wherein the reactant of (2) is in gaseous state.

3. A method as in claim 1 wherein the reaction is effected in the presence of an inert gas.

4. The method of preparing dicyclopentadienylmagnesium which comprises reacting together magnesium and gaseous cyclopentadiene, said reaction being effected at a temperature of between about 500° C. and about 600° C.

5. A method as in claim 4 wherein the reaction is effected in the presence of an inert gas.

6. The method of preparing dicyclopentadienylmagnesium which comprises reacting together magnesium and a hydrocarbon engendering cyclopentadiene, said hydrocarbon being in gaseous state, and said reaction being effected at a temperature of between about 600° C. and about 1000° C.

References Cited in the file of this patent

Miller et al.: J. Chem. Soc. (London), pages 632–635 (1952), pages 632–634 only needed.

Wilkinson: Jour. Am. Chem. Soc., vol. 76, pages 209–211 (1954), pages 209, 210 only needed.